United States Patent
Bass (10) Patent No.: US 7,748,781 B2
(45) Date of Patent: *Jul. 6, 2010

(54) HEAD AND BODY PROTECTION CHILD SAFETY SEAT

(76) Inventor: Eric Bass, P.O. Box 1131, Tavernier, FL (US) 33070

( * ) Notice: Subject to any disclaimer, the term of this patent is extended or adjusted under 35 U.S.C. 154(b) by 0 days.

This patent is subject to a terminal disclaimer.

(21) Appl. No.: 12/191,818

(22) Filed: Aug. 14, 2008

(65) Prior Publication Data

US 2009/0179470 A1 Jul. 16, 2009

Related U.S. Application Data

(63) Continuation-in-part of application No. 12/013,936, filed on Jan. 14, 2008.

(51) Int. Cl.
*A47D 1/10* (2006.01)
(52) U.S. Cl. .............................. 297/250.1; 297/216.11; 297/219.12
(58) Field of Classification Search .............. 297/250.1, 297/219.12, 216.11
See application file for complete search history.

(56) References Cited

U.S. PATENT DOCUMENTS

| | | | |
|---|---|---|---|
| 3,265,438 A | 8/1966 | Regan et al. | |
| 3,784,224 A | 1/1974 | Peeler | |
| 4,402,548 A * | 9/1983 | Mason ................ | 297/216.11 X |
| 4,687,452 A * | 8/1987 | Hull ......................... | 297/250.1 |
| 5,292,175 A | 3/1994 | Artz | |
| 5,292,176 A | 3/1994 | Artz | |
| 5,330,255 A | 7/1994 | Stawicki | |
| 5,335,968 A * | 8/1994 | Sheridan et al. .......... | 297/250.1 |
| 5,383,711 A * | 1/1995 | Houghteling ........... | 297/464 X |
| 5,516,188 A | 5/1996 | Bruhnke et al. | |
| 5,588,699 A | 12/1996 | Rundle et al. | |
| 5,720,519 A | 2/1998 | Barnes | |
| 5,765,893 A | 6/1998 | Ziegler | |
| 5,779,304 A * | 7/1998 | Cunningham .......... | 297/216.11 |
| 6,179,383 B1 * | 1/2001 | Ochi ........................ | 297/250.1 |
| 6,199,900 B1 | 3/2001 | Zeigler | |
| 6,402,251 B1 | 6/2002 | Stoll | |
| 6,685,266 B2 * | 2/2004 | James et al. .............. | 297/250.1 |
| 6,715,830 B2 * | 4/2004 | Alexy ....................... | 297/250.1 |
| 7,125,073 B2 * | 10/2006 | Yoshida .................. | 297/216.11 |
| 7,232,182 B2 * | 6/2007 | Yoshida .................. | 297/216.11 |

(Continued)

FOREIGN PATENT DOCUMENTS

DE 3544041 A1 * 6/1987 .............. 297/250.1

(Continued)

*Primary Examiner*—Rodney B White
(74) *Attorney, Agent, or Firm*—McHale & Slavin, P.A.

(57) ABSTRACT

A head and body protection assembly which includes a safety seat shell and a plurality of chambers secured to the shell. A belt which includes a plurality of chambers is placed across the lap or mid section of an individual in the seat. The chambers are inflated to a pre-selected pressure which provides protection of the occupant of the seat from side, rear and frontal impacts. The chambers or pads are inflated or deflated to permit the chambers or pads to be adjusted to the size of the occupant of the seat. The assembly includes a device to indicate the correct inflation pressure. The chambers are fluidly interconnected to distribute fluid throughout the assembly to help absorb the impact of the head of the occupant. The chambers can be filled with an energy absorbing foam.

18 Claims, 11 Drawing Sheets

U.S. PATENT DOCUMENTS

| | | | |
|---|---|---|---|
| 7,232,185 B2 | 6/2007 | Hartenstine et al. | |
| 7,234,711 B2 | 6/2007 | Gordon et al. | |
| 7,234,771 B2* | 6/2007 | Nakhla | 297/250.1 |
| 7,293,828 B2* | 11/2007 | Yoshida | 297/216.11 |
| 7,413,249 B2* | 8/2008 | Leutert | 297/250.1 X |
| 7,654,613 B2* | 2/2010 | Bass | 297/250.1 |
| 2004/0164529 A1* | 8/2004 | Yoshida | 297/216.11 X |
| 2004/0251721 A1* | 12/2004 | Yoshida | 297/250.1 |
| 2005/0099044 A1* | 5/2005 | Nakhla | 297/219.12 |
| 2005/0179288 A1* | 8/2005 | Lizaso et al. | 297/250.1 |
| 2006/0061186 A1 | 3/2006 | Funke, III et al. | |
| 2007/0085394 A1* | 4/2007 | Yang | 297/250.1 |
| 2009/0152913 A1* | 6/2009 | Amesar et al. | 297/216.11 |
| 2009/0256404 A1* | 10/2009 | Strong et al. | 297/216.11 |
| 2010/0026059 A1* | 2/2010 | Amirault et al. | 297/216.11 |

FOREIGN PATENT DOCUMENTS

| | | |
|---|---|---|
| DE | 19817329 C1 | 4/1998 |
| JP | 2000343991 | 12/2000 |

* cited by examiner

HEAD AND BODY PROTECTION CHILD SAFETY SEAT

RELATED APPLICATIONS

This application is a continuation-in-part of application Ser. No. 12/013,936, filed Jan. 14, 2008, the entirety of which is incorporated herein by reference.

FIELD OF THE INVENTION

The invention relates to head and body protection systems for safety seats for vehicles. In a preferred embodiment, the invention is a safety seat for children which comprises a fluidic assembly or assemblies secured together in an operative relationship. The improved safety seat is intended to provide an improved level of protection from impacts to the head and body of the occupant of the safety seat during vehicle accidents or sudden stops of the vehicle.

BACKGROUND OF THE INVENTION

The neck and back of an individual, in particular a child, is not strong enough to hold the individual's head in a position to prevent damage to the head during vehicle accidents or sudden vehicle stops. While many current vehicle seats are provided with head restraints to protect an adult occupant of the seat from rearward motion during an accident, the seats do not include restraints to afford the occupant protection from side impacts. This is also true for child safety seats. While the child safety seat affords some protection from side impacts, it is not sufficient to prevent neck, back and other bodily injuries. Current child safety seats afford little or no protection for the child's entire body from side impacts. Physically handicapped individuals are also susceptible to head and body injuries which may occur in vehicle collisions or sudden stops and will benefit from the present invention.

DESCRIPTION OF THE PRIOR ART

Figure 7:
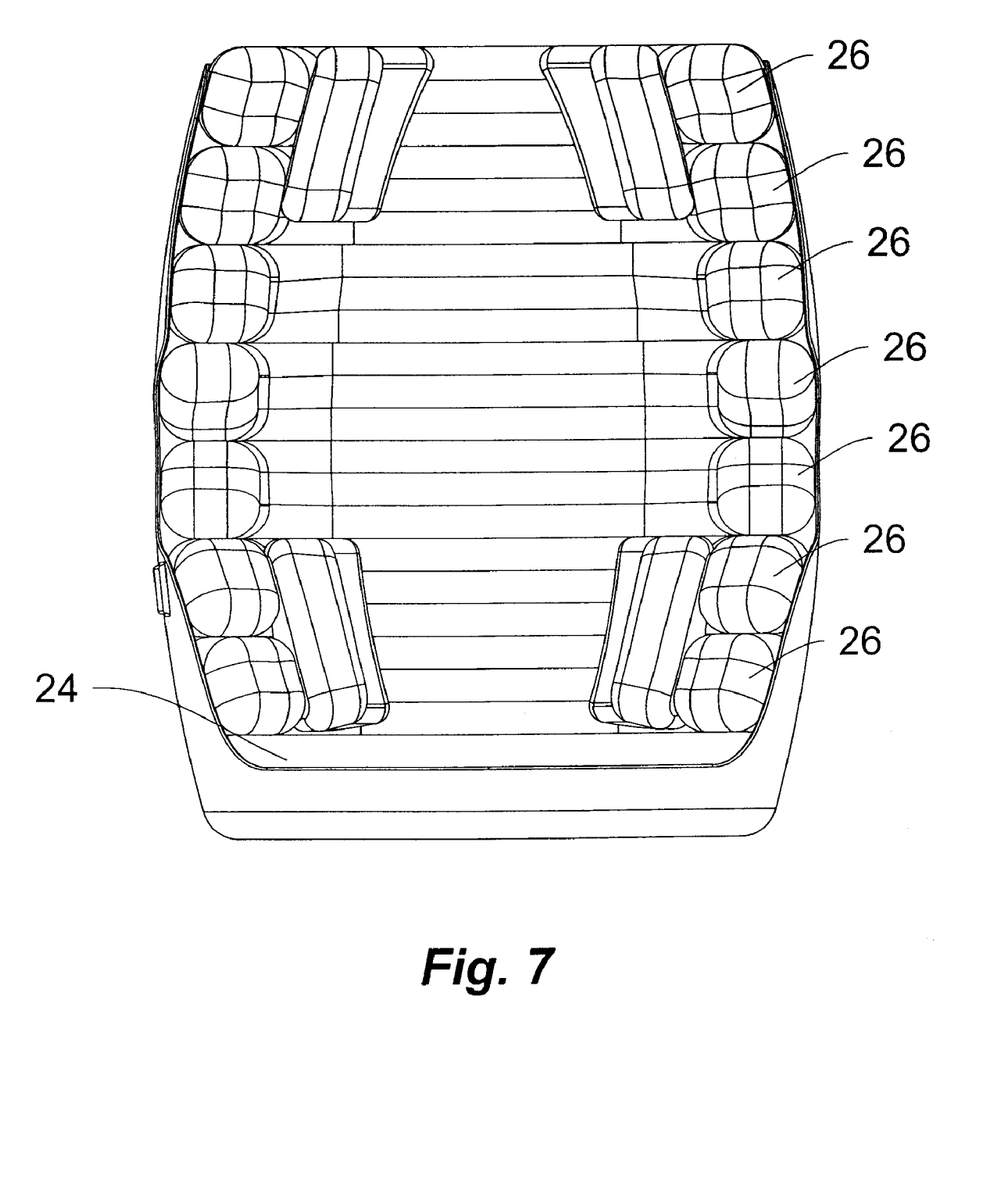
FIG. 7 is a front view of the safety seat of the present invention including the body and head protection assembly without an occupant.

U.S. Pat. No. 3,265,438 discloses a pneumatic car seat for children for use in an automobile. The car seat comprises a plurality of air bags 5, 6, 6', 11, 12, 13 and 14 which surround the child, as illustrated in FIG. 7.

U.S. Pat. No. 3,784,224 discloses a safety seat 20 and safety cushion 40 used in combination with each other. A safety belt is secured around a child and secured the child onto the safety seat. The safety cushion can be inflatable.

U.S. Pat. No. 5,292,175 discloses an inflatable child safety seat including an inflatable bottom panel, an inflatable back panel connected to the bottom panel, and a pair of opposed, laterally spaced inflatable sidewall panels. These inflatable panels are not contained within a solid shell.

U.S. Pat. No. 5,330,255 discloses a U-shaped collar including an inflatable bladder, decorative cover and a means to attach the inflatable neck support to the seat back or head restraint so as to provide an inflatable neck support. The inflatable neck support is easily adjusted by the seat occupant to meet the particular comfort needs of the seat occupant.

U.S. Pat. No. 5,516,188 discloses a device comprising as least two inflatable air chambers that form a child seat for use in a vehicle. One air chamber forms as inflatable air cushion and the other chambers represent inflatable side panels, backrest, head restraint and a tray.

U.S. Pat. No. 5,588,699 discloses a one-piece inflatable structure that fits an infant attached to a restraining mechanism. The upper portion thereof having a centrally disposed aperture for placement about the infant's neck to cushion the head should a sudden movement or contact occur, a middle section thereof positionable over the infant's chest providing a cushioned area and harness support and a lower section thereof which accommodates a portion of each of the infant's thighs and placement of the seat belt. The device operates in protecting the infant's head, neck and chest from injury by maintaining the head and neck in a substantially vertical position.

U.S. Pat. No. 5,720,519 discloses a seat structure, an air bag and an activation circuitry. The device is equipped with an alarm and/or air bag system for delivering a notification signal that the seat is properly installed and the air bag is functional. Upon activation, the air bag system, which is stored in a collapsed state within the child's seat, is rapidly expanded in front of the child so as to provide a cushioning blow in order to protect the seated child from injury upon a sudden deceleration of the vehicle.

U.S. Pat. No. 5,765,893 discloses a device for preventing head and neck injuries comprising a shell and padded lining shaped to partially enclose an infant when the restraint is attached to an infant vehicle seat. The lining includes distinct areas of different density within the padding to better absorb energy generated by an impact. The restraint further includes adjustments for fitting the restraint apparatus to different infant length sizes. The device is directed to reducing head and neck injuries in infants in moving vehicles.

U.S. Pat. No. 6,199,900 discloses a headrest including an air bag, which is inflated between the headrest and the seat upon occurrence of a collision, a fluid pressure actuation, to move the headrest to the upper position upon occurrence of a collision and at least one collision sensor to detect the occurrence of a collision. The vehicle safety collision headrest substantially instantaneously moves a headrest of a seat from a manually adjusted position to a fully extended position using a fluid pressure actuation system and inflates a front air bag between the bottom of the extended headrest and the top of the set to fill the gap there between upon the occurrence of a collision or an abrupt stop. The vehicle safety collision headrest protects against whiplash, head, neck and spinal cord injuries due to improper designed and/or positioned headrests.

U.S. Pat. No. 6,402,251 discloses a seatbelt for use on vehicles such as automobiles and airplanes. A rigid front-support includes an inflatable cushion, as illustrated in FIG. 2c.

U.S. Pat. No. 7,234,711 discloses a side protective head restraint pad, pad assembly and safety seat. The restraint pad includes an air bladder with a pump for selectively inflating the air bladder and a release valve for selectively deflating the air bladder, an energy-absorbing component and a comfort component. A flexible enclosure is provided within which the air bladder, energy-absorbing component and comfort component are positioned in overlaid configuration to define a unit. The head restraint pad is adapted for being placed in a seat in lateral alignment with one side of the head of an occupant and inflated or deflated as appropriate to restrain the head against injurious lateral movement caused by a side impact relative to the seat.

U.S. Pat. No. 7,232,185 discloses a head rest for a car seat used to transport a child in an automobile which is positionally adjustable vertically along the seat back on which the head rest is mounted. A latching mechanism is actuated by a button at the top of the head rest and includes a releasable latch engagable with the channels slidably supporting the support rails of the head rest. A retainer clip is mounted at the top of the channels to prevent the head rest from being separated from the seat back once assembled thereon. The head rest includes a pair of laterally spaced wings that are pivotally connected to the rear support portion of the headrest to be positionally adjustable relative to the child's head through an angular displacement of approximately 45 degrees. The pivot mechanism is operable to lock the wings in the selected positions.

U.S. Published Patent Application No. 2006/0061186 discloses an elastic, one-piece support band, a soft head pad which rests against an infant's head and two sets of fasteners. The support band passes through the head pad and is attached to a car seat with fasteners to support an infant's head in an upright position against the back of a car seat. The support band acts as a support system for a sleeping infant so that the infant's head does not roll around.

Japanese Patent No. 2000343991 discloses a child seat having air bags included in the seat part 2, the back part 3, and the seat belt part 4. These air bags are formed as separate air bags. A pump 9 is used to inflate the air bags. The belt portion 4 is hinged to the side portions of the seat.

German publication DE 19817329 C1 discloses an air bag including two chambers. An upper chamber 7 and a lower chamber 5. A U-shaped section 9 extends between upper chamber 7 and lower chamber 5. Section 9 defines an opening to receive and intermediate portion of a safety belt 14.

What is needed in the art is a safety seat such as a child's safety seat which affords head and body protection system for the occupant of the safety seat which can be readily secured to an existing vehicle seat. The improved car safety seat is preferably designed to be employed in vehicles which are equipped with the "LATCH" system for securing vehicle safety seats. The head and body protection systems of the present invention utilize a plurality of chambers or bladders which can be inflated to offer protection to the head and body of an occupant of the safety seat. A plurality of additional bladders offer head protection for the occupant of the seat to afford maximum protection. The head and body protection system can also include a device to indicate when it is inflated to the correct pressure to afford the proper protection. The head and body protection system can also employ energy absorbing materials, such as foam, in place of inflated chambers to afford protection to the head of the occupant.

SUMMARY OF THE INVENTION

A head and body protection assembly which includes a safety seat shell and a plurality of chambers secured to the shell. A belt which includes a plurality of chambers is placed across the lap or mid section of an individual in the seat. The chambers are inflated to a pre-selected pressure which provides protection of the occupant of the seat from side, rear and frontal impacts. The chambers or pads are inflated or deflated to permit the chambers or pads to be adjusted to the size of the occupant of the seat. The assembly includes a device to indicate the correct inflation pressure. The chambers are fluidly interconnected to distribute fluid throughout the assembly to help absorb the impact of the head of the occupant. The chambers can be filled with an energy absorbing foam.

Accordingly, it is an objective of the instant invention to provide a body and head protection assembly which will provide protection to the body and head of an occupant of a seat from side and rear impacts.

It is a further objective of the instant invention to provide a body and head protection assembly which is incorporated into the child safety seat during manufacture of the seat.

It is yet another objective of the instant invention to provide a body and head protection assembly that incorporates side and rear impact protection chambers.

It is a still further objective of the instant invention to provide a body and head protection assembly that includes adjustable chambers or pads for providing improved protection from side, rear and frontal impacts.

It is still yet another objective of the instant invention to provide a body and head protection assembly that includes an air compartment or bladder for allowing the chambers to be increased or decreased in size by inflating or deflating the chamber thereby permitting optimal fit of the assembly to the occupant of the seat.

It is yet a further objective of the instant invention to provide a head protection assembly that includes a plurality of chambers that can be individually inflated or deflated to permit optimal fit of the assembly to the occupant of the seat.

It is still a further objective of the instant invention to provide a body and head protection assembly that includes an indicator for indicating the correct inflation pressure of the body and head protection assembly.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
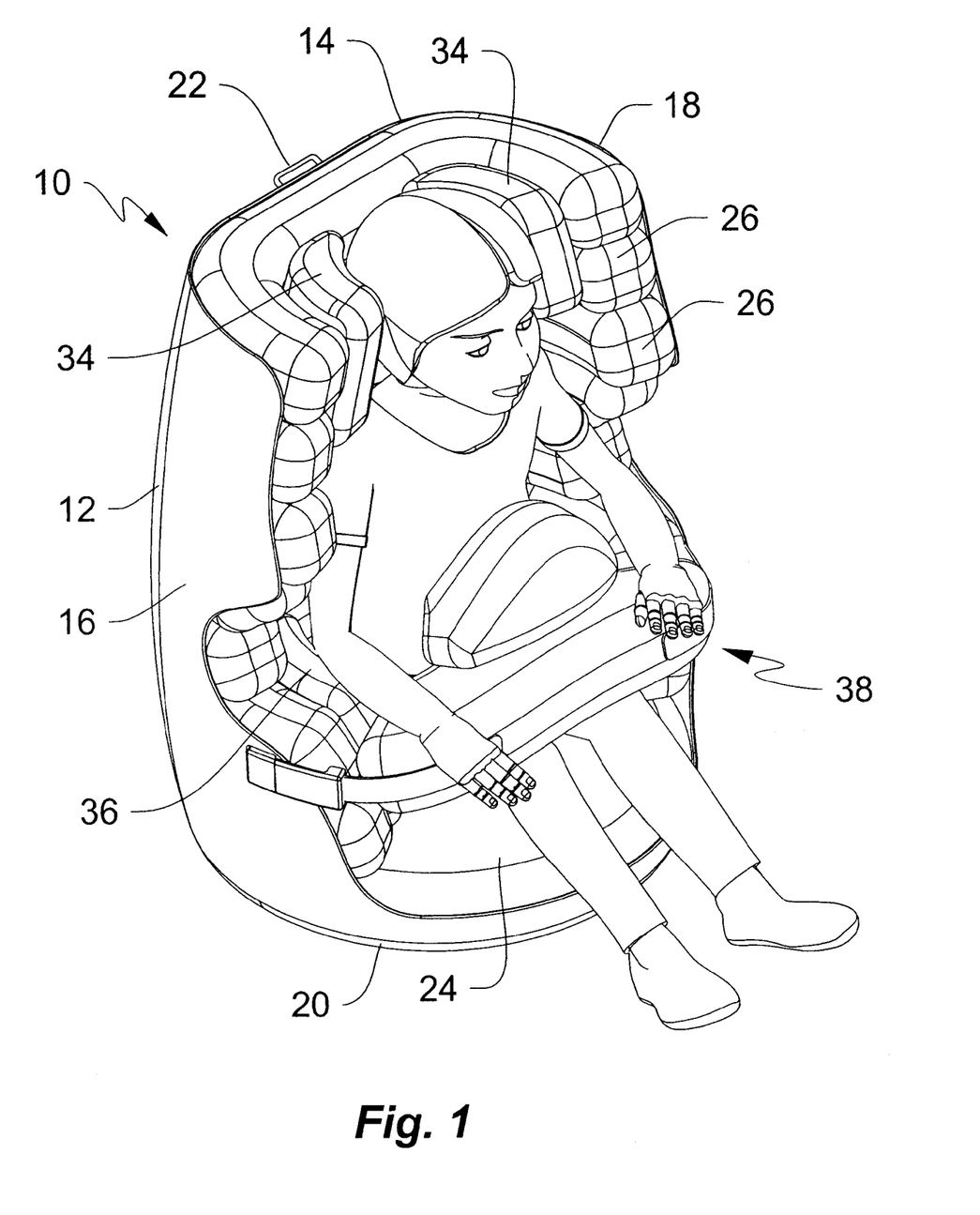
FIG. 1 is a front perspective view of a safety seat including the body and head protection assembly of the present invention and an individual seated therein.
Figure 2:
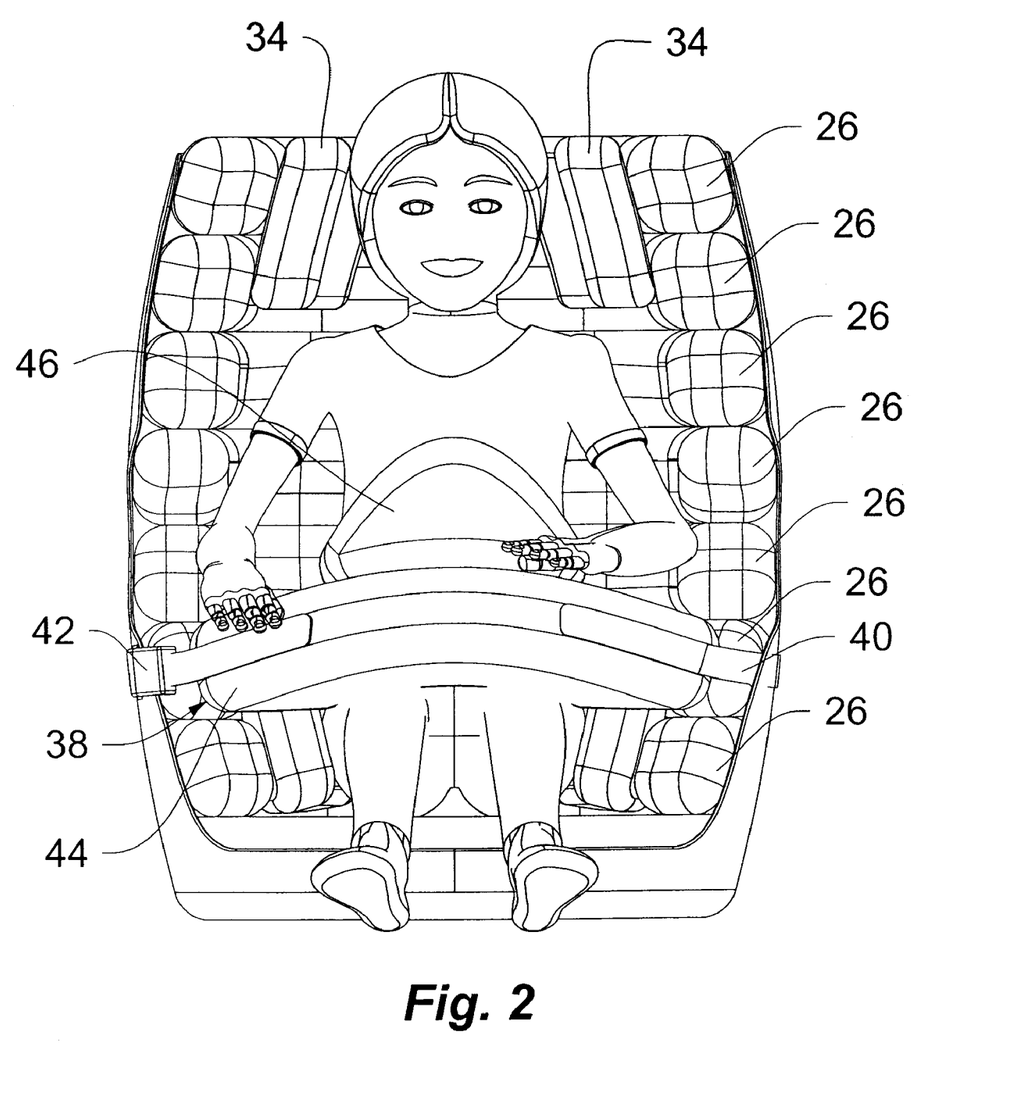
FIG. 2 is a front view of FIG. 1 of the safety seat of the present invention including the body and head protection assembly.
Figure 3:
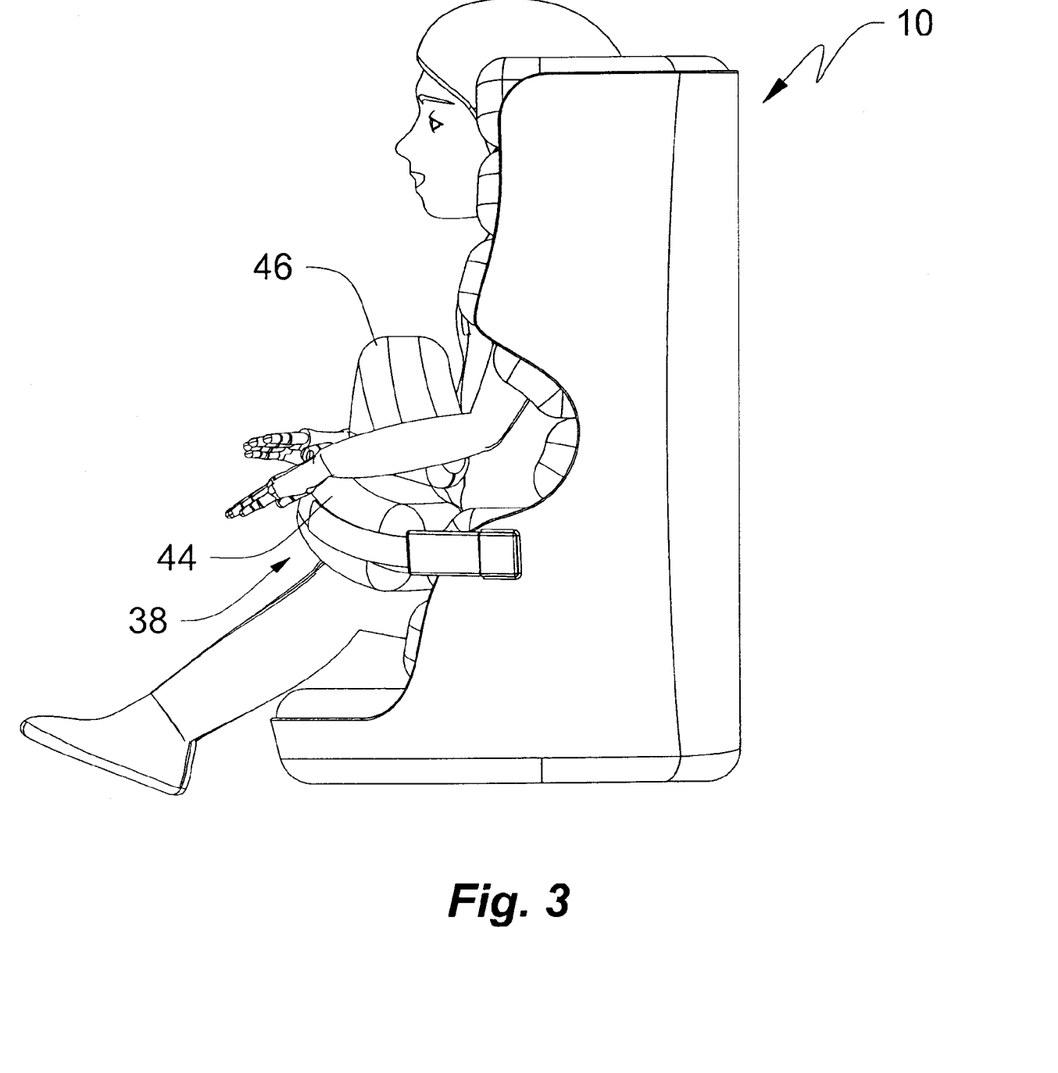
FIG. 3 is a side view of the safety seat of the present invention including the body and head protection assembly.
Figure 4:
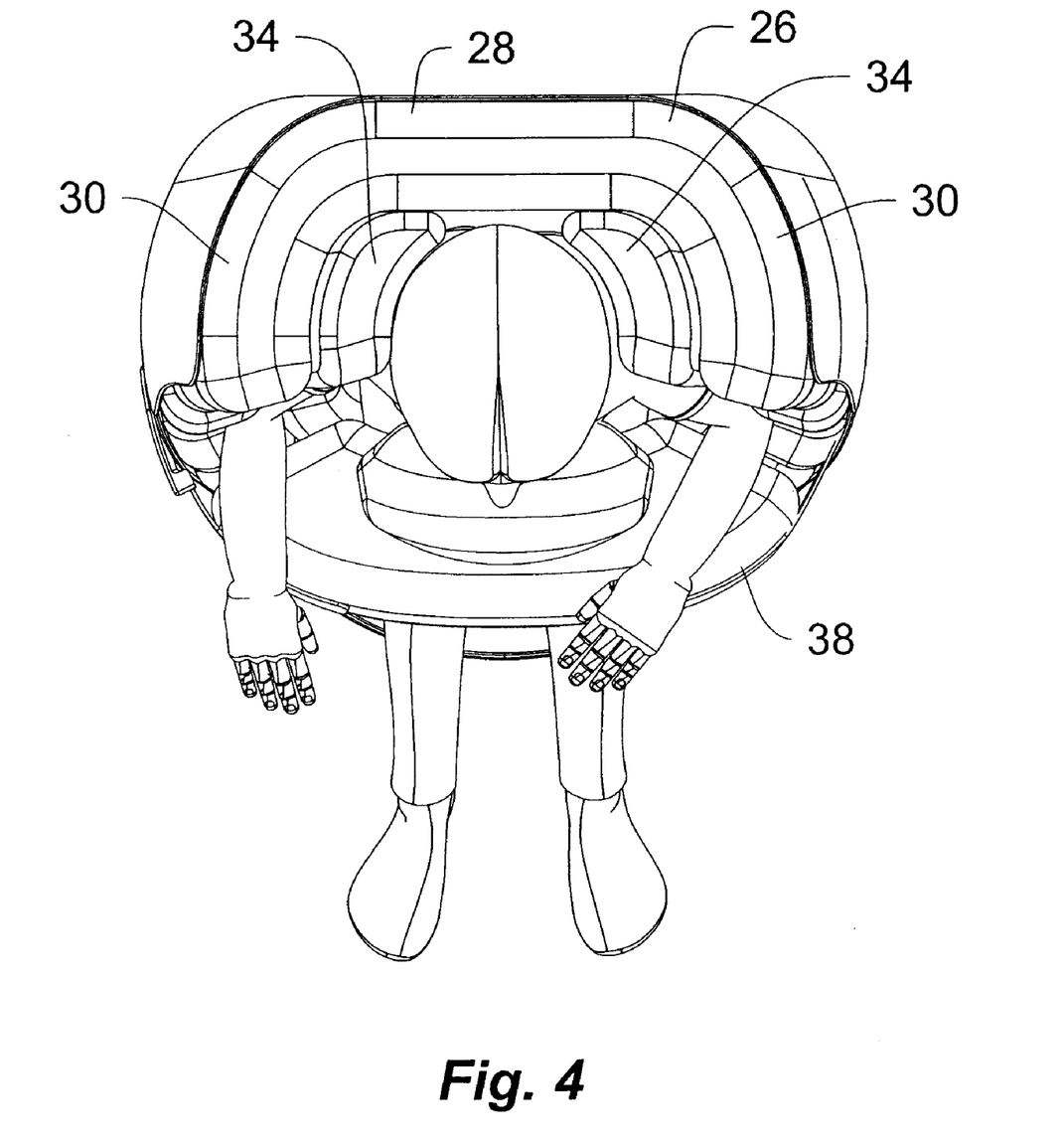
FIG. 4 is a top view of the safety seat of the present invention including the body and head protection assembly.

Referring now to the drawings a safety seat 10 is illustrated in FIGS. 1-9B. In a preferred embodiment of the invention the seat is a child safety seat for use in a vehicle. The safety seat can also be sized and constructed to accommodate a physically handicapped adult individual. The safety seat 10 includes a shell 12 onto which head and body protection assemblies are secured. The shell 12 is preferably formed of a rigid material, such as plastic, which can readily be manufactured into any desired shape. The material of shell 12 should also be relatively light weight enabling an individual to place and remove the safety seat within a vehicle. The material of shell 12 must also be of sufficient strength to withstand impacts and forces from all directions without damage. This material is also sufficiently strong to meet government standards for safety seats for children and adults. As can be seen in FIGS. 1-9B the shell 12 forms the back 14, both sides 16, 18 and bottom 20 of the safety seat. The sides 16 and 18 are shaped or contoured to contain head and body protection assemblies while permitting the individual within the seat freedom of movement. For example, as seen in FIGS. 1, 3 and 4 the individual seated in the safety seat can move both of their arms outwardly toward their sides. In the vicinity of the top of the shell 12 is a securing device 22 which enables the safety seat to be used in vehicles equipped with a LATCH (Lower Anchors and Tethers for Children) system. This securing device 22 also enables the safety seat 10 to be used with top tethers for securing safety seats in vehicles. The safety seat 10 is also designed to be installed in a vehicle using a conventional seatbelt method.

Secured to the bottom 20 of the shell is a seat 24 upon which a child or individual is seated. The seat 24 is preferably padded and covered with a material that is comfortable and does not irritate an individual seated on the seat. The seat 24 can also be designed to provide protection to the individual within the safety seat in the event of a crash or other impact. The seat 24 preferably comprises a one or more pieces of foam or similar energy absorbing material that are enclosed in a fabric enclosure. A visco-elastic polyurethane foam commonly known as memory foam can also be used in seat 24. The foam provides a cushion for the occupant of the seat. The foam can also provide protection for the occupant of the safety seat in the event of sudden impacts or other forces imposed on the safety seat and occupant. In place of foam, an inflatable cushion or inflatable bladder or bladders can also be employed as a seat. The degree or extent to which the cushion or bladder is inflated or deflated will determine the hardness or softness of the inflatable cushion or bladder. This inflation will also determine the protection afforded to the occupant of the safety seat by the inflatable cushion or bolder.

Figure 5:
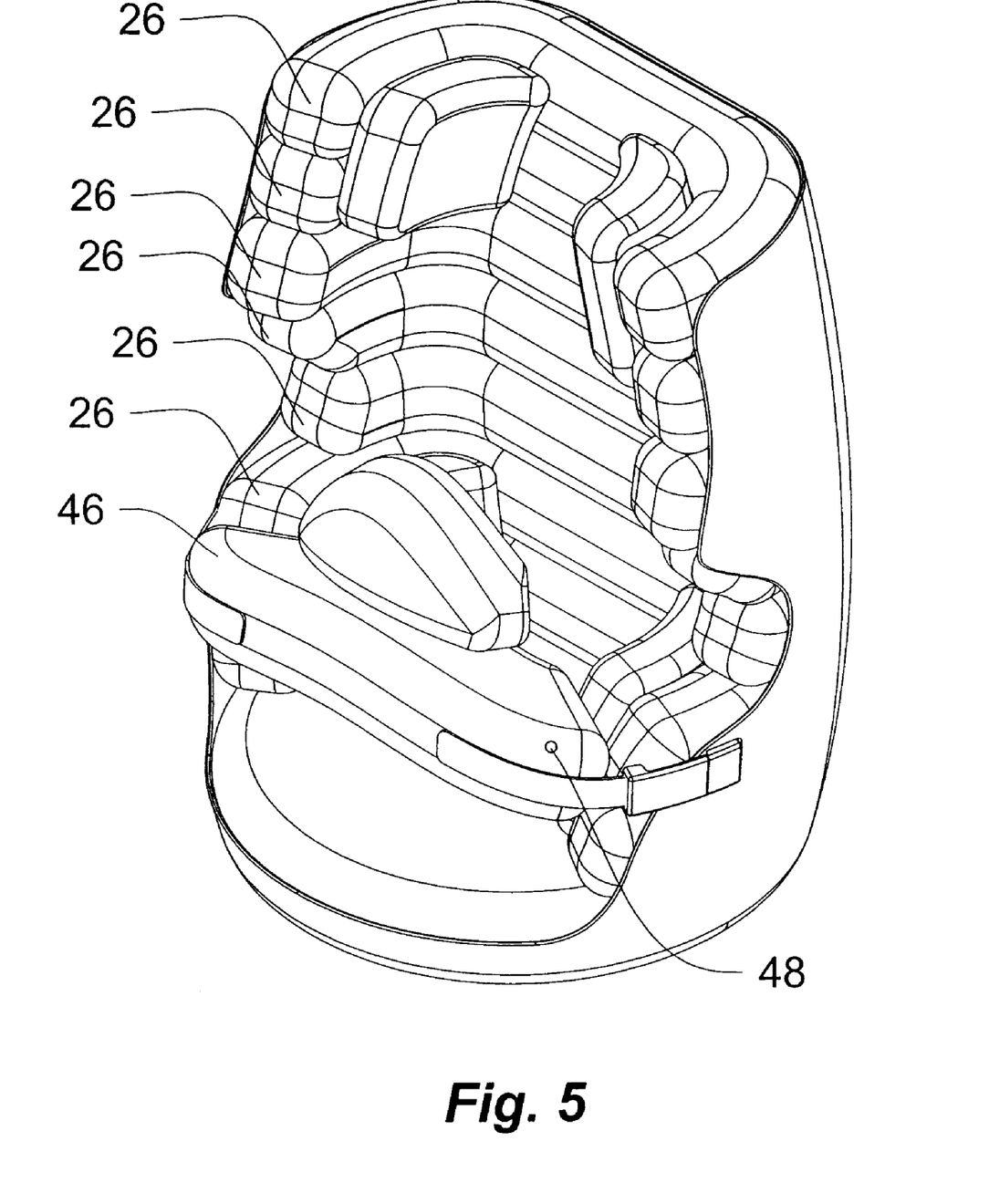
FIG. 5 is a front perspective view of the safety seat of the present invention including the body and head protection assembly without an occupant.
Figure 6A:
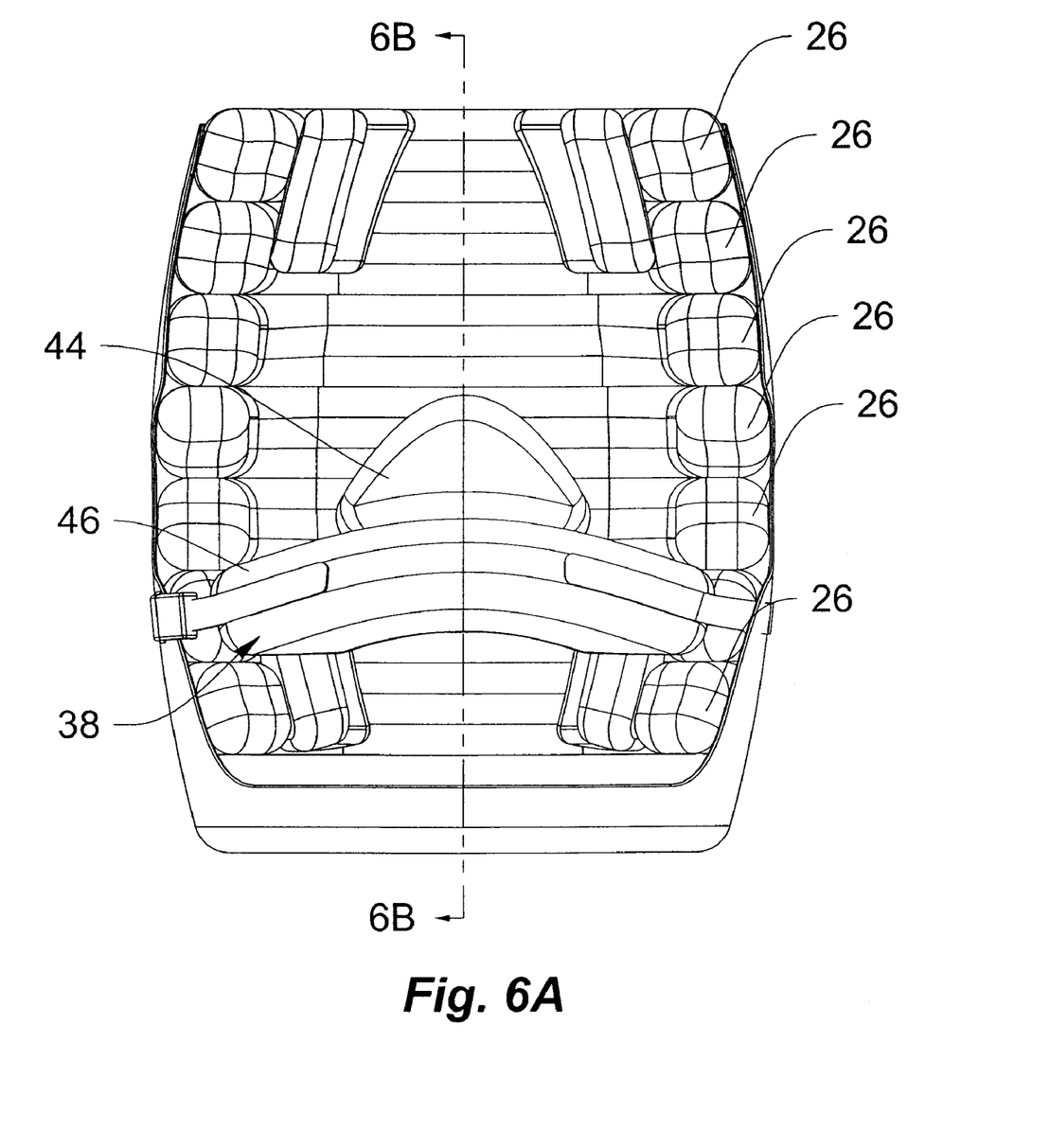
FIG. 6A is a front view of the safety seat of the present invention including the body and head protection assembly without an occupant.
Figure 6B:
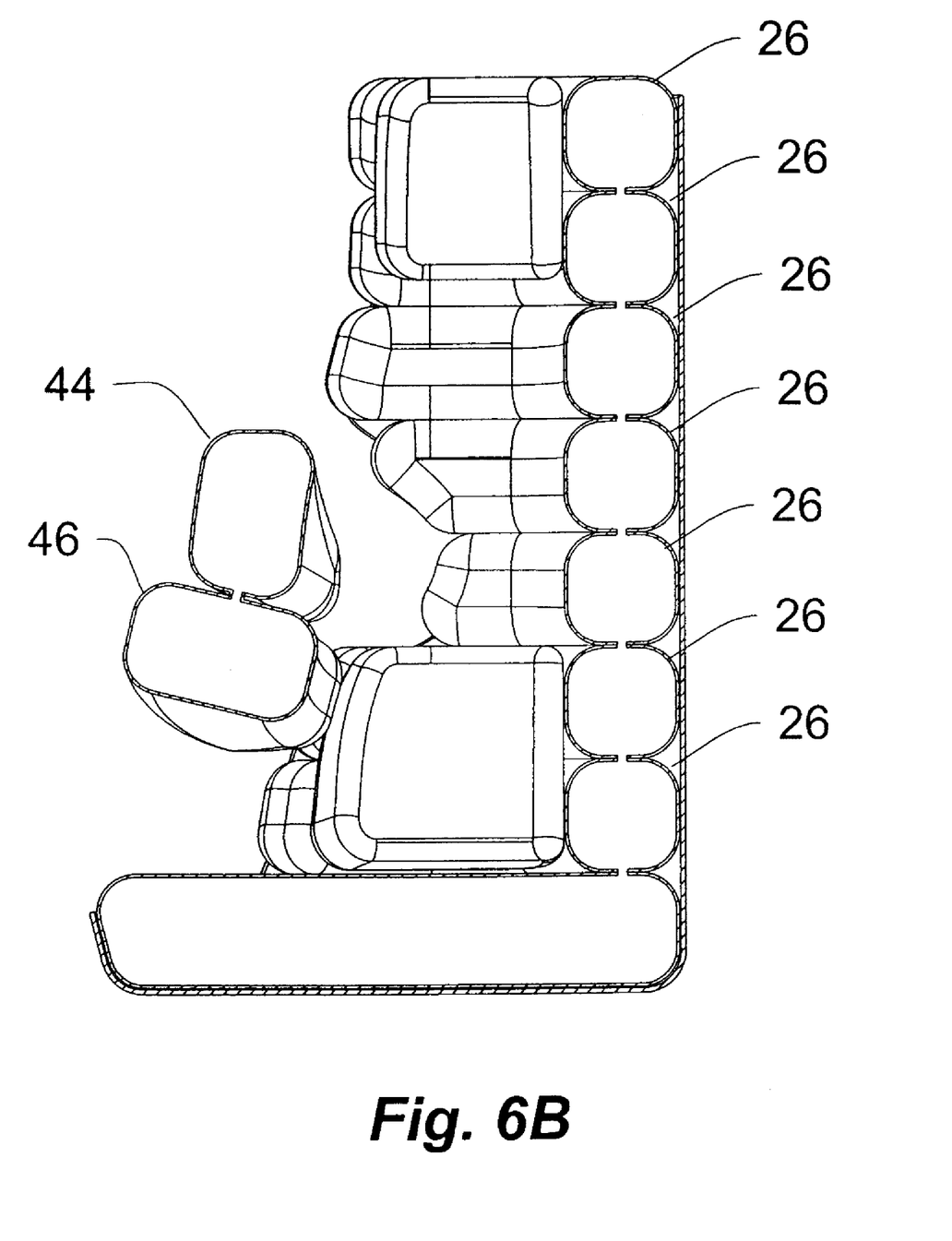
FIG. 6B is a sectional view taken alone line 6B-6B in FIG. 6A.
Figure 8:
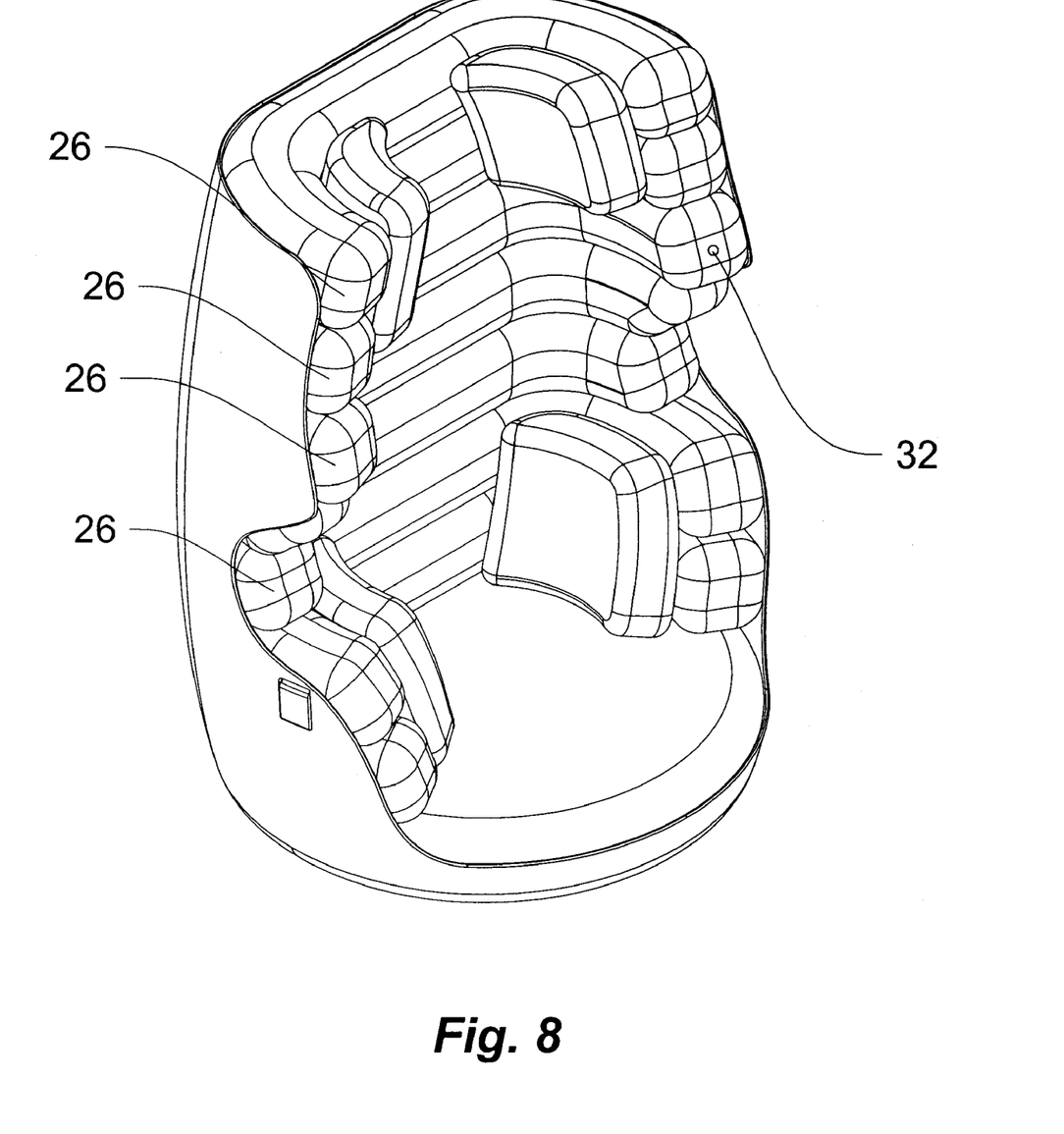
FIG. 8 is a front perspective view of the safety seat of the present invention including the body and head protection assembly without an occupant.
Figure 9A:
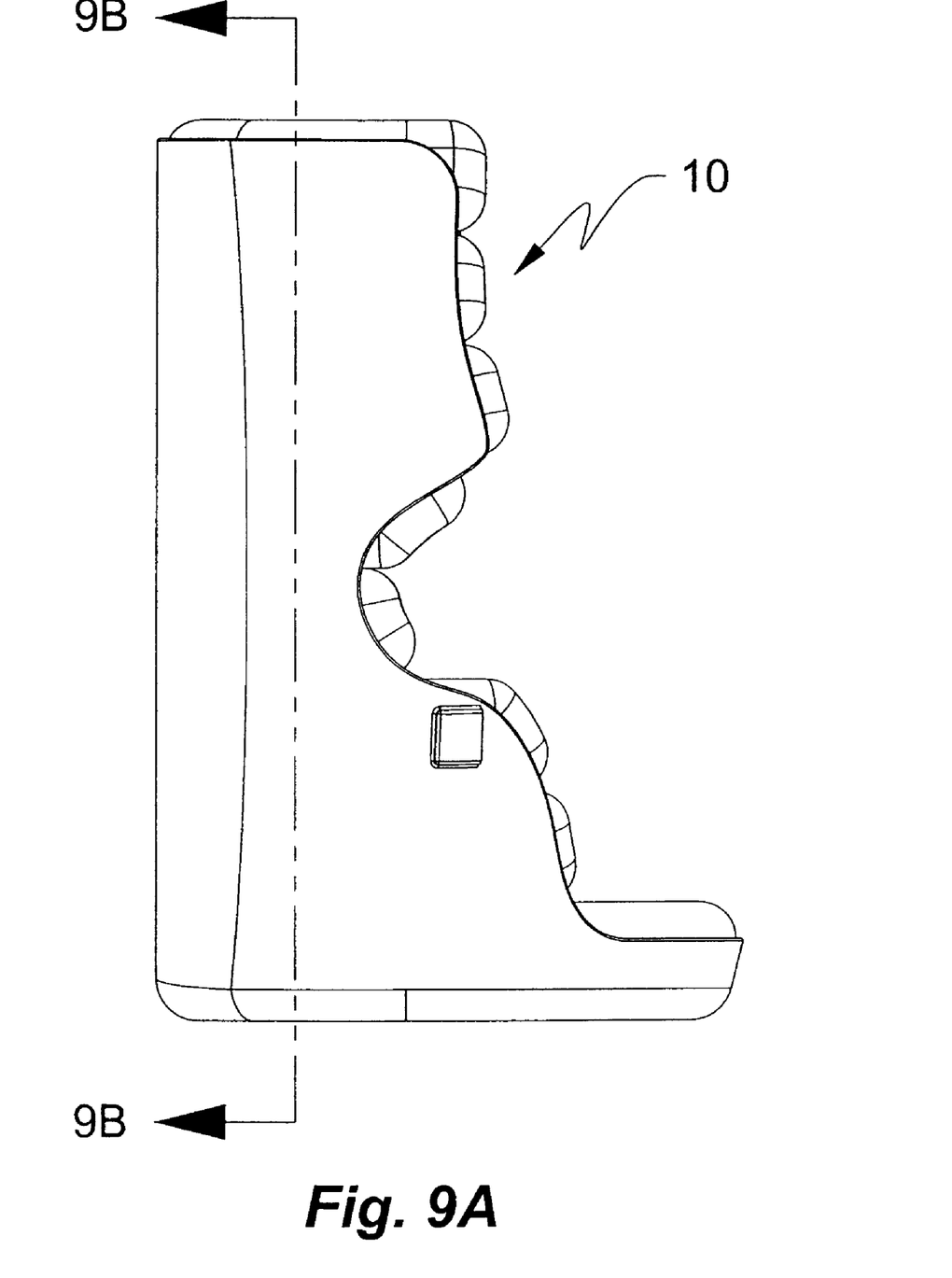
FIG. 9A is a side view of the safety seat of the present invention without an occupant.
Figure 9B:
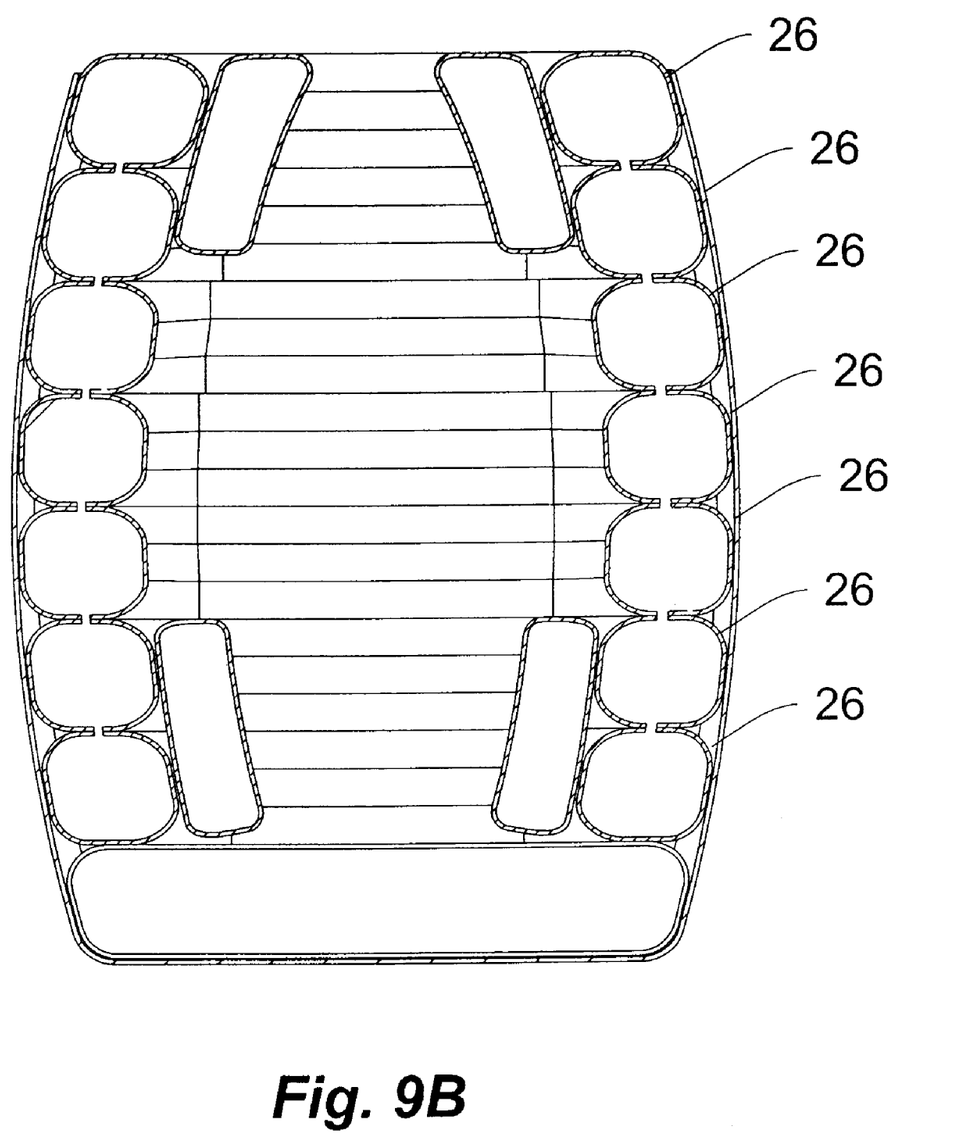
FIG. 9B is a sectional view taken along line 9B-9B in FIG. 9A.

A plurality of substantially U-shaped inflatable chambers 26 comprises a body protection assembly. The U-shaped chambers 26 can bee seen in FIGS. 1, 2, and 4-9B. Each of the chambers 26 is preferably formed of a fluid impermeable material. In addition, one or more fluid impermeable bladders can be placed within each of the chambers 26. Alternatively, foam or other energy absorbing materials can be used to fill the chambers 26. A visco-elastic polyurethane foam commonly known as memory foam can also be used in chambers 26. The U-shaped chambers 26 are placed one above the other in vertical alignment to form a body protection assembly. This can be clearly seen in FIGS. 1 and 7. As illustrated in FIG. 4, an elongate compartment 28 of the chamber 26 extends along the back of the safety seat and affords the occupant of the safety seat body protection from impacts. Shorter compartments 30 of the chamber 26 are connected to both ends of compartment 28. These compartments 30 extend along each side 16, 18 of the safety seat 10. Compartments 30 afford the occupant of the safety seat protection against impacts and other forces coming from the sides of the safety seat. As seen in FIGS. 1, 5 and 8 the length of the compartments 30 of each chamber 26 is determined by the width or depth of each of the sides 16, 18 of the safety seat. These shorter compartments 30 together with compartment 28 form the substantially U-shaped chamber 26. The chambers 26 located in an upper portion of the safety seat also afford protection to the head and neck of the occupant of the safety seat. The chambers 26 are preferably interconnected to each other, as seen in FIGS. 6B and 9B, enabling them to be inflated to a desired pressure from a single source of fluid pressure. Each of the chambers 26 can be a single fluid filled chamber, a single chamber filled by a fluid bladder or a plurality of separate chambers interconnected to form a single chamber 26. A plurality of separate chambers could also be secured to each other without being interconnected to each other. While the chambers 26 are illustrated as positioned horizontally in the safety seat 10 they could also be positioned vertically or at an angle with respect to the horizontal axis or the vertical axis of the safety seat.

A pump or similar device, not shown, is employed to deliver a fluid (liquid and/or gas) to the chambers 26 of the safety seat. The fluid can be supplied to a single inlet 32, FIG. 8, located on one of the chambers 26 if all of the chambers 26 are interconnected to each other. Alternatively, a plurality of inlets can supply fluid to the chambers. There can be one inlet per chamber. Alternatively, a group of chambers, 2 or more, can be interconnected and one inlet can be used to supply the group. The pump is preferably connected to the inlets 30 only during the initial filling of chambers 26. However, the pump could remain connected to the inlets thus enabling the pressure of the fluid within the chambers to be adjusted and regulated. The pump could be activated by a pressure sensor within the chambers or by a sensor located elsewhere. For example in the event of an accident, an impact sensor on a vehicle, such as an accelerometer, load sensor or other type of sensor could be used to activate the pump. The pump can be used to introduce fluid into the chambers or withdraw fluid from the chambers.

The pressure with in the chambers 26 can also be controlled by a regulator valve. The regulator valve can be used in place of valve 32 to supply fluid to the chambers 26. The regulator valve would maintain the fluid pressure within the chambers 26 at a desired pre-selected pressure. Valve 32 could also be a pressure indicator, thus enabling a user of the safety seat to determine if sufficient or excessive fluid pressure existed with in the chambers 26. Valve 32 can also be a visual or audible indicator. In the embodiments where the chambers 26 are not fluidly connected to each other or small groups of chambers 26 are fluidly connected to each other there would be a plurality of valves 32 and/or pressure regulators/indicators.

Regulating the fluid pressure with the chambers 26 also enables the safety seat 10 to be sized or adjusted to the shape and/or size of the occupant of the safety seat. For example, children of different ages and sizes could use the same safety seat by inflating/deflating the chambers 26 to proximate the size/shape of each individual child such that each different child is afforded the same protection in the event of a crash or sudden impact.

When the safety seat is used for adults, the safety seat 10 can sized or adjusted to the shape and/or size of different individuals. An example would be a safety seat used in the transportation of handicapped individuals. Another example would be a safety seat used in a race or stunt vehicle. The safety seat 10 can be employed in all types of vehicles and situations wherein the safety of an individual is a concern.

In an embodiment the compartments 28 and 30 of chamber 26 are fluidly connected such that fluid can flow from one of the compartments 28, 30 to another compartment 28, 30. In the event of a crash or sudden impact the entire body or a portion of the body of an occupant of the safety seat would be thrown against a part of the safety seat. For example, in the event of a side crash or impact, the side of an occupant of the seat would be thrown against the side of the safety seat on which the crash or impact occurred. The compartments 30 on the impact side of the safety seat would be compressed by the body of the occupant of the seat. In order to absorb the force of the occupant's body toward the side of the seat and dissipate this force, the fluid with the compartment 30 on the impact side would be displaced into compartment 28 along the rear portion of the seat. This affords the occupant better protection in a crash or sudden impact that if the fluid remained within compartment 30.

In the event of a rear crash or impact the fluid within compartment 28 would be displaced into compartments 30 of chambers 26 on the sides of the seat to absorb the impact of the body of the occupant of the seat. The chambers 26 can also be fluidly connected to each other so that the force of a crash or impact can be absorbed or dissipated by a plurality of chambers 26. The fluid within one or more of the chambers 26 would be displaced into one or more of the other chambers 26 to dissipate the force of a crash or impact.

Chambers 34 are located on the sides of the safety seat in the vicinity of the head of the occupant of the seat. Each of these chambers 34 can be similar to a chamber 26. For example, each of the chambers 34 is preferably formed of a fluid impermeable material. In addition, one or more fluid impermeable bladders can be placed within each of the chambers 34. Alternatively, foam or other energy absorbing materials can be used to fill the chambers 34. A visco-elastic polyurethane foam commonly known as memory foam can also be used in chambers 34. While the chambers 34 are preferably separate from chambers 26, they could be fluidly connected to chambers 26.

Chambers 36 are located on the sides of the safety seat in the vicinity of the lower portion of the torso or hips of an occupant of the seat. Each of these chambers 36 can be similar to a chamber 26. For example, each of the chambers 36 is preferably formed of a fluid impermeable material. In addition, one or more fluid impermeable bladders can be placed within each of the chambers 36. Alternatively, foam or other energy absorbing materials can be used to fill the chambers 36. A visco-elastic polyurethane foam commonly known as memory foam can also be used in chambers 36. While the chambers 36 are preferably separate from chambers 26, they could be fluidly connected to chambers 26.

A seatbelt or lap restraint 38 extends from one side 16 of the safety seat to the other side 18 of the safety seat. The lap belt or seatbelt preferably includes a belt 40 which is secured to one side of the safety seat and releasably secured to the other side of the safety seat with a releasable fastening mechanism 42, FIG. 2. Secured to belt 40 is one or more chambers 44, 46. Each of these chambers 44, 46 can be similar to a chamber 26. For example, each of the chambers 44, 46 is preferably formed of a fluid impermeable material. In addition, one or more fluid impermeable bladders can be placed within each of the chambers 44, 46. Alternatively, foam or other energy absorbing materials can be used to fill the chambers 44, 46. A visco-elastic polyurethane foam commonly known as memory foam can also be used in chambers 44, 46. While the chamber 44 is preferably separate from chambers 46, they could be fluidly connected to each other. In addition each of the chambers 44 and 46 could be formed from a plurality of individual chambers which could be connected to each other or separate from each other. The chambers 44, 46 can be filled with fluid through a valve 48 located on chamber 46. Valve 48 is similar to valve 30 on chamber 26. An additional valve could be located on chamber 44.

Chambers 44 and 46 function in a manner similar to chambers 26. When an occupant of the safety seat is thrown or forced onto the chambers 44, 46 the fluid within the chambers is displaced to absorb the impact of the occupant, as disclosed above. Also, valve 48 could be designed to allow some fluid within chamber 44 and/or 46 to be released so as to dissipate the force of the impact.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A safety seat comprising:
   a shell defining a relatively rigid seat back, seat sides and a seat bottom;
   a head and body protection assembly, said head and body protection assembly including at least one chamber containing a fluid;
   said at least one chamber being expandable and contractible;
   said head and body protection assembly constructed and arranged to be placed in said shell in alignment with a head and body of an occupant of said safety seat;
   a device securing said safety seat to a support surface,
   a device for selectively expanding said at least one chamber and a valve for selectively contracting said at least one chamber, said at least one chamber is expanded or contracted relative to the size of an occupant of said safety seat to remove excess space between said safety seat shell and the occupant; and
   a device for indicating when said at least one chamber is expanded or contracted relative to the size of an occupant of said safety seat to remove excess space between said safety seat shell and the occupant whereby a head and body of an occupant of said safety seat are protected against forward, rearward and lateral movement relative to said safety seat.

2. The safety seat of claim 1 including a plurality of chambers, at least two of said chambers positioned adjacent said seat back and said seat sides.

3. The safety seat of claim 2 wherein said plurality of chambers are separated from each other by a fluid impermeable barrier, said fluid impermeable barrier including at least one fluid passageway connecting adjacent chambers, said fluid passageway enabling the passage of fluid from one chamber to an adjacent chamber whereby the displacement of fluid from a chamber enables said chamber to absorb an impact of a head or body of an occupant of said safety seat against said safety seat.

4. The safety seat of claim 2 including at least one additional chamber which is not fluidly connected to said plurality of chambers.

5. The safety seat of claim 2 wherein said at least two chambers each extend continuously from one of said seat sides along said seat back and to said other seat side.

6. The safety seat of claim 5 including at least one additional chamber, said additional chamber positioned on said safety seat adjacent both sides of a head of an occupant of said safety seat whereby the head is protected against lateral movements relative to said safety seat.

7. The safety seat of claim 2 including at least one additional chamber, said additional chamber positioned on said safety seat adjacent both sides of a head of an occupant of said safety seat whereby the head is protected against lateral movements.

8. The safety seat of claim 1 including a device for selectively expanding and contracting said at least one chamber.

9. The safety seat of claim 8 wherein said device is a pump.

10. The safety seat of claim 1 including a lap restraint extending from one side of said safety seat to another side of said safety seat, said lap restraint including at least one chamber containing a fluid, said at least one chamber being expandable and contractible whereby said at least one chamber absorbs an impact of a body of an occupant of said safety seat against said chamber thereby protecting the body against forward movement relative to said safety seat.

11. The safety seat of claim 1 including a fluid bladder positioned within said at least one chamber, said fluid bladder being expandable and contractible.

12. The safety seat of claim 1 wherein at least one of said chambers contains an energy absorbing material, said energy absorbing material being compressible whereby a head and body of an occupant of said safety seat are protected against forward, rearward and lateral movement relative to said safety seat.

13. The safety seat of claim 12 wherein said energy absorbing material is foam.

14. The safety seat of claim 1 wherein said at least one chamber contains a fluid for expansion and contraction and said device for indicating when said at least one chamber is correctly expanded or contracted is an audible device.

15. The safety seat of claim 1 including a lap restraint extending from one side of said safety seat to another side of said safety seat, said lap restraint including at least one chamber containing an energy absorbing material, whereby said at least one chamber absorbs an impact of a body of an occupant of said safety seat against said chamber thereby protecting the body against forward movement relative to said safety seat.

16. The safety seat of claim 1 including a seat upon which an occupant of said safety seat is seated, said seat contains an energy absorbing material.

17. The safety seat of claim 1 including a plurality of chambers, at least two of said chambers positioned ion alignment with each other and between said shell and a head and body of an occupant of said safety seat.

18. The safety seat of claim 17 wherein at least one of said chambers in alignment contains an energy absorbing material, said energy absorbing material being compressible whereby a head and body of an occupant of said safety seat are protected against forward, rearward and lateral movement relative to said safety seat.

* * * * *